United States Patent
Chancellor et al.

(10) Patent No.: US 7,894,579 B1
(45) Date of Patent: Feb. 22, 2011

(54) MANAGING EMERGENCY SERVICES ON A PER-TELEPHONE-NUMBER BASIS

(75) Inventors: Sandra J Chancellor, Bueytown, AL (US); Anne-Marie Darr, Alpharetta, GA (US)

(73) Assignee: AT&T Intellectual Propert II, L.P., Reno, NV (US)

( * ) Notice: Subject to any disclaimer, the term of this patent is extended or adjusted under 35 U.S.C. 154(b) by 1226 days.

(21) Appl. No.: 11/464,629

(22) Filed: Aug. 15, 2006

Related U.S. Application Data

(60) Provisional application No. 60/743,122, filed on Jan. 12, 2006.

(51) Int. Cl.
*H04M 11/04* (2006.01)
(52) U.S. Cl. .................................... 379/45; 379/114.03
(58) Field of Classification Search .................. 379/45, 379/126, 127.01–127.05
See application file for complete search history.

(56) References Cited

U.S. PATENT DOCUMENTS

| | | | |
|---|---|---|---|
| 5,311,569 A * | 5/1994 | Brozovich et al. ............ 379/45 |
| 6,608,892 B2 * | 8/2003 | Shaffer et al. .......... 379/207.12 |
| 6,731,721 B2 * | 5/2004 | Tanaka et al. ................. 379/45 |
| 7,123,693 B2 * | 10/2006 | Nelson et al. ................. 379/45 |
| 2004/0153344 A1 * | 8/2004 | Bui et al. ........................ 705/3 |
| 2007/0201623 A1 * | 8/2007 | Hines et al. ................... 379/37 |

\* cited by examiner

*Primary Examiner*—Curtis Kuntz
*Assistant Examiner*—Maria El-Zoobi
(74) *Attorney, Agent, or Firm*—Akerman Senterfitt; Michael K. Dixon

(57) ABSTRACT

Computer readable storage media containing computer executable instructions for performing methods for managing emergency services on a per-communication-address basis in a call distributor are described herein. A plurality of different communications addresses may be deployed behind the call distributor. The media may include instructions for creating a record that is associated with a communications address deployed behind the call distributor and that indicates that the communications address is managed under a source indication service for any emergency calls that originate from the communications address. The media may also include instructions for creating a record that is associated with a communications address deployed behind the call distributor and that indicates that the communications address is not managed under the source indication service.

20 Claims, 3 Drawing Sheets

MANAGING EMERGENCY SERVICES ON A PER-TELEPHONE-NUMBER BASIS

CROSS-REFERENCE TO RELATED APPLICATIONS

To the fullest extent permitted under 35 U.S.C. §119(e), this application claims the benefit of the filing date of U.S. Provisional Patent Application No. 60/743,122, filed 12 Jan. 2006, entitled "Managing 911 Services on a Per-Telephone-Number Basis in a PBX". The contents of this priority application are incorporated by this reference as if set forth verbatim herein.

BACKGROUND

Private branch exchanges (PBXs) are telephone exchanges or switches owned by a private firm, as distinguished from being owned by common carriers or by telephone companies. PBXs are commonly deployed in a variety of different environments, typically where a given business enterprise maintains a large number of individual telephone numbers on behalf of its employees. Other examples of PBX deployments include academic institutions, charities, or the like. Generally speaking, the term "telecommunications customer" refers herein to any of the foregoing examples.

The Emergency service, commonly referred to as "911 service", may be deployed with PBX systems in the types of environments described above. In this manner, the employees, students, or the like using the telephone numbers deployed behind the PBX may initiate 911 emergency calls from work or school as if they were home.

In these types of environments, the telecommunications customer may be faced with the separate tasks of maintaining the PBX system and maintaining the 911 service. Also, the PBX system and the 911 service may be supported by separate data stores. The telecommunications customer may thus decide to delegate the function of maintaining the PBX system to a telecommunications provider, and to delegate the function of maintaining the 911 database to a 911 database vendor. The 911 services vendor may also be viewed as a subcontractor of the telecommunications provider, without loss of generality.

In the above scenario data management between the telecommunications customer, the telecommunications provider, and the 911 database vendor becomes an ongoing challenge. More particularly, the databases that support the PBX telephone numbers often change due to normal daily operations. Due to these changes, the database that supports the 911 calls may become outdated and inaccurate.

More specifically, PBX environments may be located within a jurisdiction that has deployed emergency services, such as the 911 service. Callers whose communications devices are deployed behind the PBX expect to be able to dial an emergency number (e.g., 9-1-1) and have their address information displayed to emergency services personnel, the same as if they had dialed the emergency number from their homes.

Despite these expectations, there are differences between the PBX environment and a residential environment. For example, an emergency services database may store addresses for particular stations from which emergency calls may originate. For convenience, but not limitation, individual telephone numbers or other communication addresses or identifiers that are deployed behind the PBX are referred to as "stations". When an emergency call arrives from a given station, the address corresponding to that given station is pulled from the database and presented to emergency services personnel.

In a PBX context, the emergency services database may store a demarcation point between local telephone company facilities and central office facilities as the address for all stations behind the PBX. However, some PBX stations may not be located at this stored demarcation point. For example, in a campus-like deployment, different stations behind the PBX may be located in different geographic locations. In this example, the emergency services database may not store specific locations for all of the stations behind the PBX.

In some cases, the implementation as described above may not meet the needs of some customers. Thus, there is a need to enable customers to store more specific location information in the emergency services database.

SUMMARY

Computer readable storage media containing computer executable instructions for performing methods for managing emergency services on a per-communication-address basis in a call distributor are described herein. A plurality of different communications addresses may be deployed behind the call distributor. The media may include instructions for creating a record that is associated with a communications address deployed behind the call distributor and that indicates that the communications address is managed under a source indication service for any emergency calls that originate from the communications address. The media may also include instructions for creating a record that is associated with a communications address deployed behind the call distributor and that indicates that the communications address is not managed under the source indication service.

BRIEF DESCRIPTIONS OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
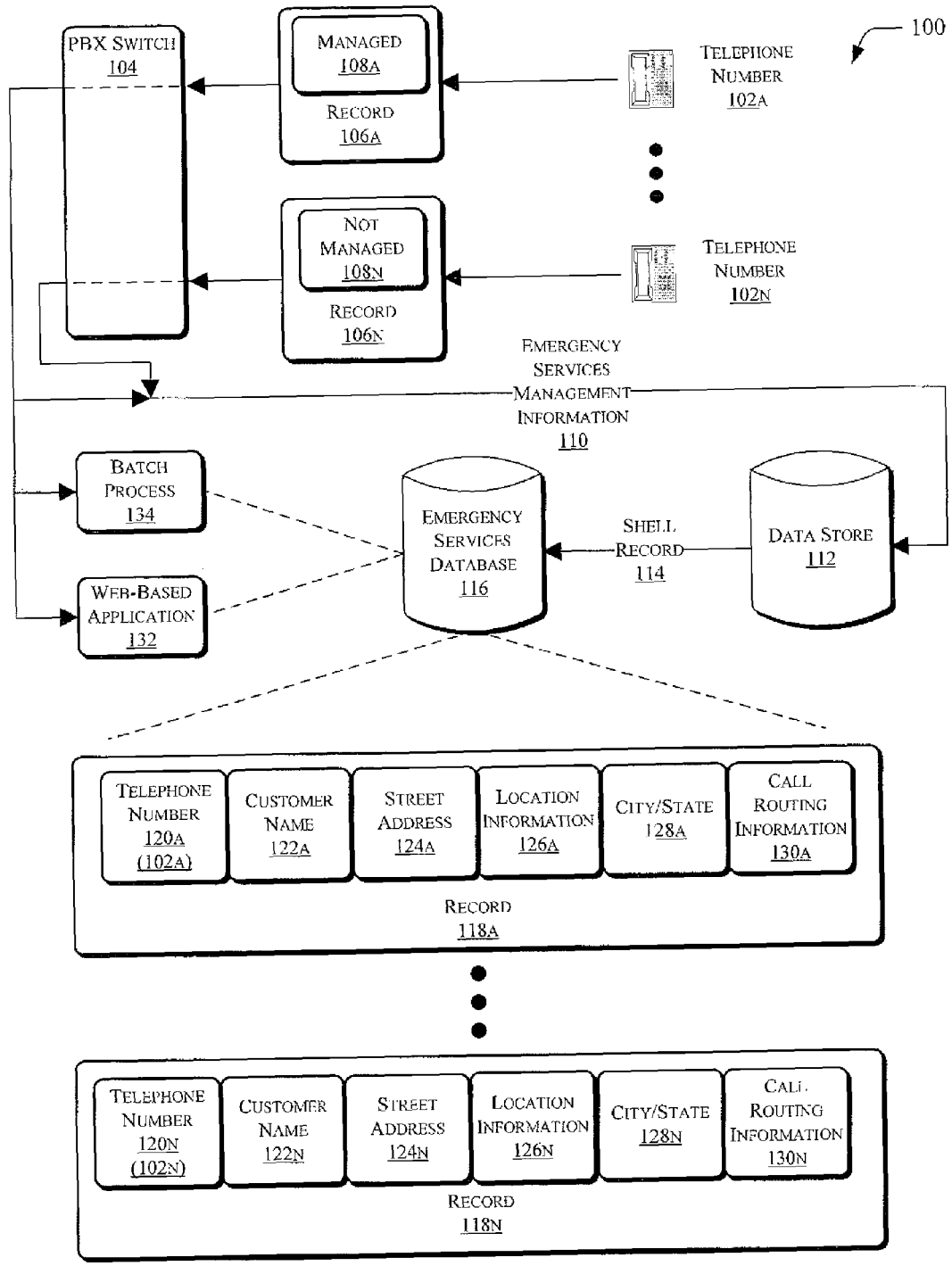
FIG. 1 illustrates an overall operating environment for managing emergency services on a per-communications-address basis according to an exemplary embodiment.

FIG. 1 illustrates an overall operating environment 100 for managing emergency services on a per-telephone-number basis according to an exemplary embodiment. In the following description and the appended drawings, emergency services are referred to as "911 services". However, it should be appreciated that the disclosure is not limited to 911 calls but may be applicable to any emergency service call. Referring to FIG. 1, a plurality of new telephone numbers 102 are provisioned behind, for example, a PBX switch 104. More generally, block 104 may represent any form of call distributor system, implemented as, for example, a switch, a PBX or the like. FIG. 1 shows two new telephone numbers 102a and 102n, although it is understood that any number of new telephone numbers 102 are contemplated. For convenience of illustration, the telephone numbers 102 are shown in connection with graphic elements representing telephone devices associated with the telephone numbers 102.

It is noted that the PBX switch 104 shown in FIG. 1 may be implemented in a Voice over IP (VoIP) environment. In such environments, the PBX may be termed a VoIP PBX. In other implementations, the PBX may operate in a time-division multiplexed (TDM) environment. In these latter example environments, the PBX may be termed a TDM PBX.

It is also noted that FIG. 1 and the description herein references the telephone numbers 102 as only examples of more general communication addresses. In, for example, a VoIP implementation, the telephone numbers may take the form of network addresses, or other similar identifiers.

The PBX switch 104 and the telephone numbers 102 may be deployed in a corporate, academic, charitable, or other enterprise, for example, such that persons can initiate emergency calls from the telephone numbers 102, which are deployed behind the PBX switch 104. Other deployments are possible, and the above examples are understood to be non-limiting.

At least some of the new telephone numbers 102 may be managed under a service that provides detailed location information in connection with, for example only, 911-type emergency calls. For convenience of reference only, and without loss of generality, such services are referred to herein as "emergency call source indication services". A non-limiting example of such a service is the BELLSOUTH® PINPOINT® service offered by BellSouth Corporation. Without such emergency call source indication services, information relating to calls originating from the telephone numbers 102 may not display, or, will display only the PBX billing address information to the emergency operators, because the telephone numbers 102 are behind the PBX switch 104. However, emergency call source indication services enable specific address and location information related to these telephone numbers 102 behind the PBX switch 104 to be available to the emergency operators.

The operating environment 100 may enable respective records 106 to be created in connection with the telephone numbers 102. FIG. 1 shows two example records 106*a* and 106*n* corresponding to two example telephone numbers 102*a* and 102*n*. The records 106*a* and 106*n* are referenced collectively as records 106. The records 106 can include, at least in part, a respective field 108 that indicates whether the telephone number 102 associated with the record is currently managed, or is to be managed, under the emergency call source indication services discussed above. The BELLSOUTH® PINPOINT® service discussed above is an example of such a service.

In some implementations, the fields 108 can take the form of a Universal Service Order Code (USOC). The fields 108 can contain various values to indicate whether the associated telephone number 102 is managed under the emergency call source indication services. For example, as shown in FIG. 1, the field 108*a* contains a value indicating that the telephone number 102*a* is, or is to be, managed under the emergency call source indication services. The field 108*n* contains a value indicating that the telephone number 102*b* is not, or is not to be, managed under the emergency call source indication services.

When new ones of the telephone numbers 102 are to be deployed behind the PBX switch 104, or when records 106 relating to existing telephone numbers 102 are deleted or updated, 911 management information 110 pertaining to the telephone numbers 102 is passed to a data store 112. This information 110 may be populated, at least in part, based on the records 106 and/or the fields 108, and may indicate whether given telephone numbers 102 are managed under emergency call source indication services.

A shell record 114 may be sent from the data store 112 to an emergency services data base 116 in connection with new telephone numbers 102. Additionally, the shell record 114 may be sent when records 106 pertaining to existing telephone numbers 102 are updated. Shell records 114 can be created and sent for those telephone numbers (e.g., telephone number 102*a*) whose corresponding fields (e.g., 108*a*) indicate that the number is managed under emergency call source indication services.

In describing and illustrating the data store 112 and the database 116, it is noted that FIG. 1 shows these items as separate components only for convenience of reference, but not to limit possible implementations of this description. For example, in some implementations, the data store 112 and the database 116 may be integrated into a single component. In other implementations, these items may be included as part of the PBX.

The shell record 114 can be provided automatically to the emergency services database 116. For example, the shell record 114 can be populated with the address of the main PBX account for the switch 104. In this manner, the shell record 114 is available substantially immediately to present data related to a emergency call originating from the new telephone number 102, even if the PBX customer has not yet updated the telephone number 102 with a station-specific address. For convenience, but not limitation, individual telephone numbers or other communication addresses or identifiers that are deployed behind the PBX are referred to as "stations".

The above features are contrasted with previous approaches, in which telephone numbers and related information may not be available for display during an emergency call, until the PBX customer submits the initial load for all stations pertaining to a given account. For large PBX accounts, loading data for a large number of different telephone numbers may be a lengthy process, thereby delaying emergency call support for the new numbers. However, the above features enable an acceptable minimum level of emergency call support sooner after provisioning of the new numbers.

In the above manner, the emergency services database 116 can be automatically notified of those records (e.g., the record 106*a*) indicating that a related telephone number (e.g., the telephone number 102*a*) is to be managed using the emergency call source indication services. The emergency services database 116 stores a record 118 for each deployed telephone number 102 that is managed, or is to be managed, using the 911 information service. The emergency services database 116 may be maintained by the telecommunications customer, the telecommunications provider, or by a third-party database services vendor.

Turning to the emergency services database 116 in more detail, FIG. 1 shows two respective records 118*a* and 118*n* in the emergency services database 116, corresponding to the two example telephone numbers 102*a* and 102*n*. The records 118*a* and 118*n* are referenced collectively as records 118. A telephone number field 120 can contain the telephone number corresponding to the record 118. A customer name field 122 can contain the name of a customer associated with a given telephone number 102.

A street address field 124 can contain data representing a street address associated with the particular record 118. A location information field 126 can indicate where the telephone number 102 is located, for example, an office number, a building number, floor number, or the like. For example, the telephone number 102a may be located in a given room on a given floor of a given building, while the telephone number 102b may be located in a different room on a different floor of the same building.

For telephone numbers that are managed under the emergency call source indication services (e.g., the records 106a and 118a), the street address field 124 and the location field 126 may be filled by the emergency call source indication services. For telephone numbers that are not managed under the emergency call source indication services (e.g., the records 106n and 118n), the street address field 124 may be filled with the main billing address for the PBX switch 104. The location field 126 may or may not be filled for the record 118b.

A field 128 can contain city and state information related to the telephone number 102. A field 130 can contain call routing information used to route emergency calls originating from the telephone number 102 corresponding to the given record 118. For example, the field 130 can indicate which E9-1-1 Public Safety Answering Point (PSAP) would receive an emergency call originating from the telephone number 102.

It is noted that the records 118a and 118n may contain respective instances of the fields 120-430. Additionally, the records 118 may be keyed or indexed for search at least by the telephone number field 120, or by any other field in the records 118. Finally, the emergency services database 116 may contain fields other than those shown in FIG. 1, or may contain a subset of such fields, without departing from the scope and spirit of the subject matter described herein. For convenience of illustration, either of the records 118a or 118b shown in FIG. 1 can be based upon the shell record 114.

After provisioning, the shell record 114 as sent to the emergency services database 116 may then be updated and populated further as part of the initial service order affecting the new telephone number 102. A web-based application 130, a batch process 132, or other processes associated with the emergency services database 116 may update and populate the records 118.

It is noted that the operating environment 100 enables administrators or other personnel to specify on a per-telephone number (TN) basis whether given telephone numbers are managed under the emergency call source indication services. Put differently, the operating environment 100 enables the telecommunications customer to decide on a per-TN basis whether to manage individual telephone numbers 102 under the emergency call source indication services. Also, this feature enables the telecommunications customer to have emergency call location-related services billed on a per-TN basis.

Having described the above features related to emergency call support, it is noted that the field 112 may also support processing for Local Number Portability (LNP). When provisioning a new telephone number 102 that is subject to LNP processing, the field 112 may be referenced to determine whether the new telephone number 102 is also being managed under the emergency call source indication services, in addition to being eligible for LNP processing. If so, the LNP processing can invoke logic with an entity maintaining the emergency services database 116 that processes any locks and/or unlocks of the record 118 related to the porting of the telephone number 102 to a different local service provider.

Figure 2:
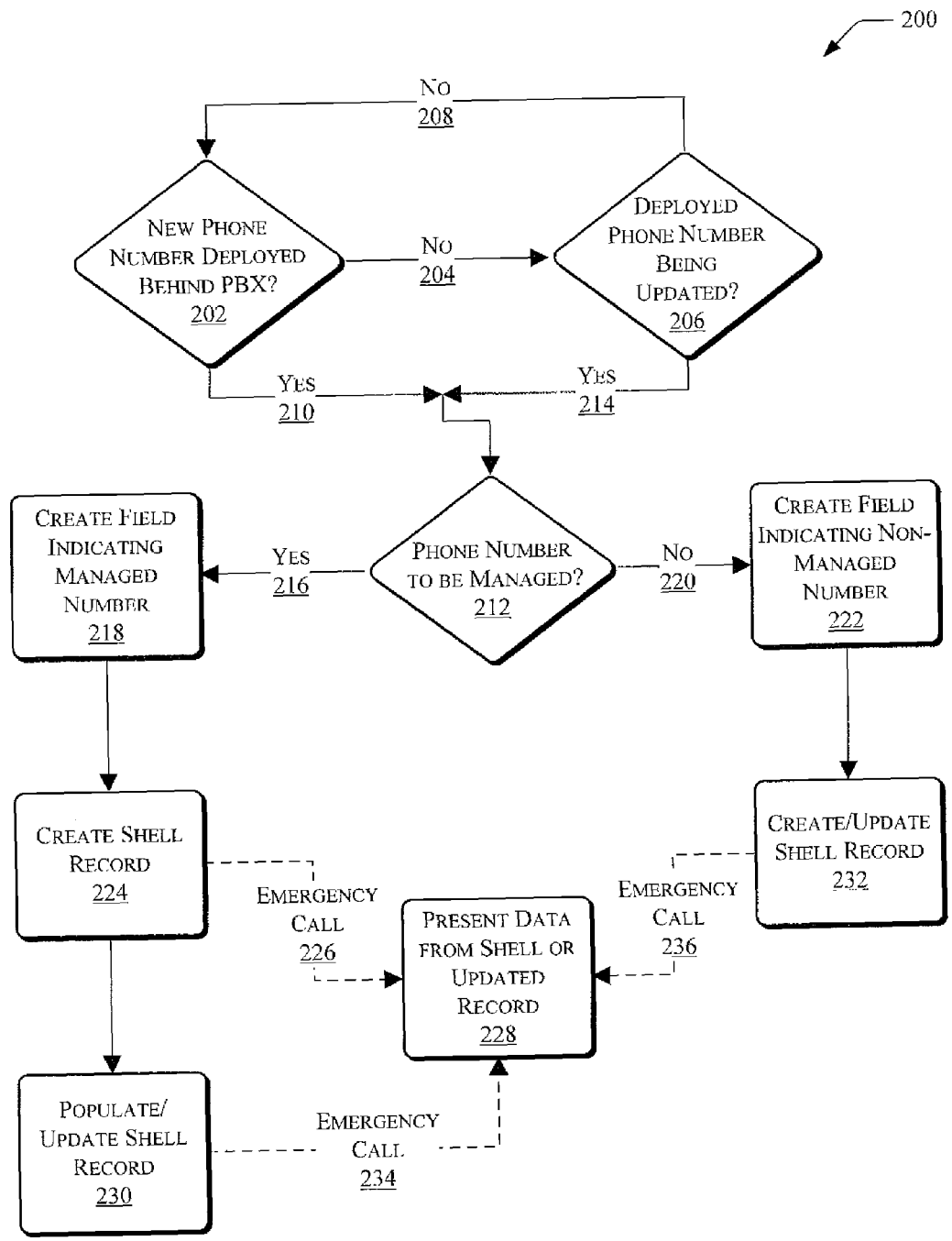
FIG. 2 illustrates a process flow for managing emergency services on a per-communications-address basis according to an exemplary embodiment

FIG. 2 illustrates a process flow 200 for managing emergency services on a per-communications-address according to an exemplary embodiment. While the process flow 200 is described in connection with certain components shown in FIG. 1, it is noted that at least part of the process flow 200 may be performed by other components without departing from the scope and spirit of the description herein.

It is also noted that implementations of the process flow 200 may perform at least some, but not necessarily all, of the processes shown in FIG. 2. Implementations may also include processes in addition to those shown in FIG. 2. Also, the order in which FIG. 2 presents these processes is chosen only for convenience of illustration and description, and not for limitation.

Decision block 202 represents testing for whether a new communications address, such as a telephone number, has been deployed behind the switch or PBX. If no new number has been so deployed, then the process flow 200 takes No branch 204 to decision block 206.

Decision block 206 represents testing for whether information pertaining to an existing communications address, which has been deployed behind the switch, has been updated, deleted, or the like. If an existing address has been updated, then the process flow 200 takes No branch 208 to return to decision block 202.

In the foregoing manner, the process flow 200 may loop indefinitely until one of at least two events occurs. From block 202, if a new address is deployed behind the switch, then the process flow 200 takes branch 210 to block 212, which is described further below. Similarly, from block 206, if an existing address is updated, then the process flow 200 takes branch 214 to block 212.

Decision block 212 tests whether the communications address is managed, or to be managed, under source indication services for emergency calls originating from this address. If so, the process flow 200 takes branch 216 to block 218.

Block 218 represents creating a field in a record corresponding to the communications address, with the field indicating that the communications address is to be managed under source indication services for any emergency calls originating from this communications address. An example of such a record is shown in FIG. 1 at 106A, and an example of a suitable field is shown at 108A.

Returning to block 212, if the communications address is not to be managed under the source indication services, then the process flow 200 takes branch 220 to block 222.

Block 222 represents creating a field in a record corresponding to the communications address, with the field indicating that the communications address is not to be managed under source indication services for any emergency calls originating from this address. An example of such a record is shown in FIG. 1 at 106n, and an example of a suitable field is shown at 108n.

After performing block 218, the process flow 200 may proceed to block 224. Block 224 represents creating a shell record for the new or updated communications address in the emergency services database for numbers that are to be managed under the source indication services. As described above, the shell record provides a bare minimum record that enables emergency services to process emergency calls originated from the new or updated communications address. More particularly, the shell record enables interim processing of emergency calls that may occur before the new or updated communications address is fully provisioned or updated. A dashed line 226 represents a data flow from the shell record as created, which data flow occurs in response to an emergency call originating from the new or updated communications address. Block 228 represents presenting data from the shell record in connection with processing the shell record.

Block 230 generally represents more fully populating or updating the shell record after the shell record is created. For example, block 230 may include modifying the shell record in connection with an update that is received from the switch customer after the shell record is created. As indicated in FIG. 1, the emergency call 226 may occur and be serviced before the shell record is more fully populated in block 230.

The shell record also indicates on a per-communications address basis whether the address is to be managed under the source indication services for emergency calls. An example of the shell record is shown at 114 in FIG. 1.

Block 232 represents creating and updating a shell record for the new or updated communications address in the emergency services database for addresses deployed behind the switch that are not to be managed under the source indication services. In other respects, the shell record created in block 232 may be similar to the shell record created in block 224.

From block 230, a dashed line 234 to block 228 represents a data flow from the updated shell record in response to an emergency call. Accordingly, data from the shell record as originally created (line 226) or from the record as subsequently updated (line 234) may flow to block 228 during an emergency call originating from a managed number.

From block 232, a dashed line 236 from block 232 to block 228 represents a data flow from the created or updated shell record. This data flow may occur in response to an emergency call originating from the new or updated communications address that was processed in block 232.

Figure 3:
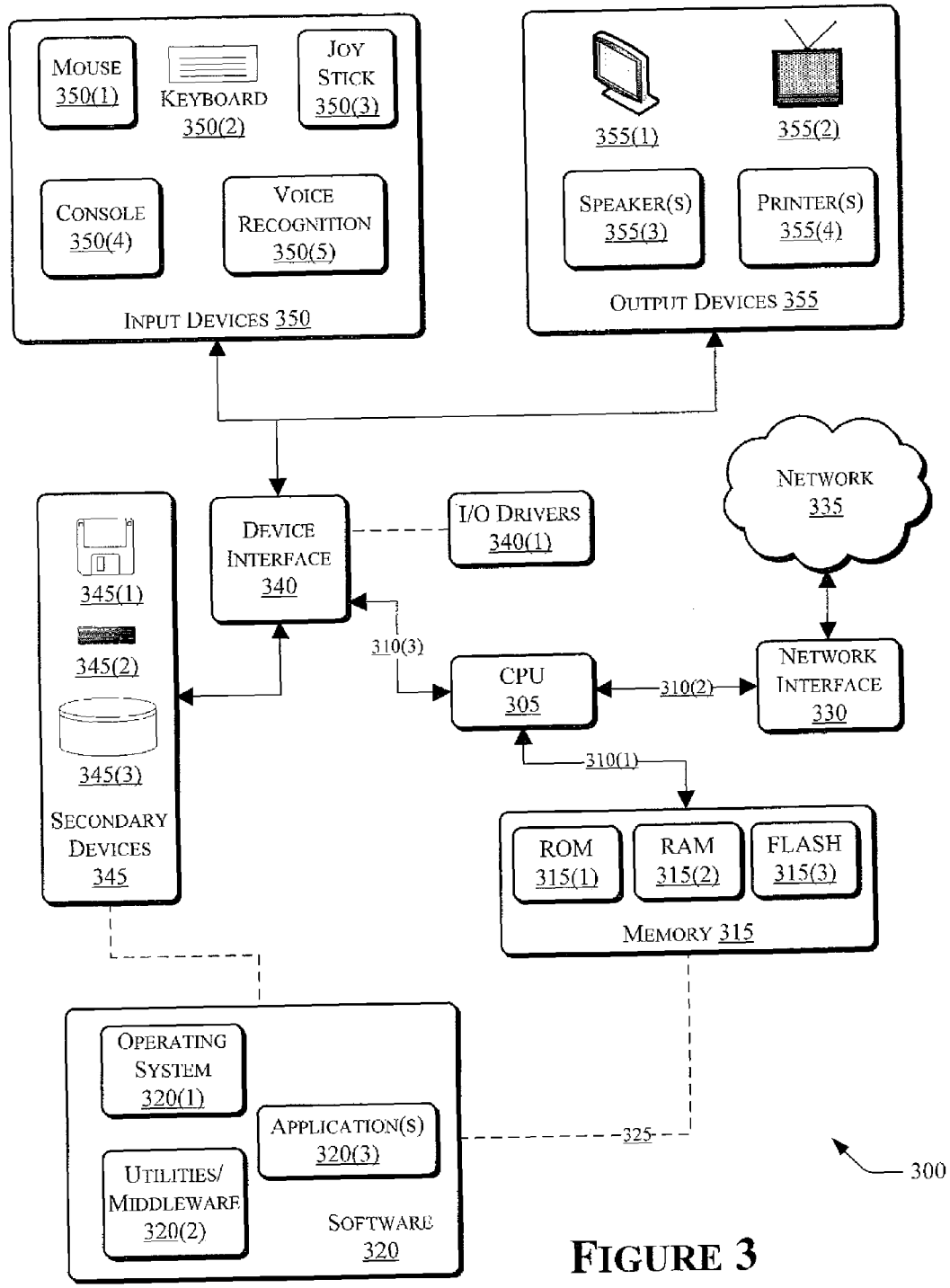
FIG. 3 illustrates an overall computing environment for managing emergency services on a per-communications-address according to an exemplary embodiment.

FIG. 3 illustrates an overall computing environment 300 for managing emergency services on a per-communications address basis according to an exemplary embodiment. More particularly, aspects of the computing environment 300 may be used in whole or in part to construct or host, for example, the various the operating environment as described above in FIG. 1. More specifically, the various data storage devices shown in FIG. 3 may store computer-readable instructions that, when executed, perform at least part of the method shown in FIG. 2. These data storage devices may also host the emergency services database 116, the data store 112, and/or the records stored therein. Hardware components shown in FIG. 3 may implement the PBX switch 104, any servers related to the data stores 112 and 116. Processor resources shown in FIG. 3 may support execution of the batch process 134 and/or the web-based application 132, both of which are shown in FIG. 1.

Any of the foregoing may be implemented as a computer-based device or a computing environment 300 that includes a central processing unit (CPU) 305. The CPU 305 communicates with a variety of components via busses 310. It is understood that the layout of the busses 310 is shown in FIG. 3 for convenience and clarity of illustration, and implementations of the teachings herein may integrate the respective busses 310 into a common bus 310.

The CPU 305 communicates with a memory module 315 via a bus 310(1). The bus 310(1) may be of any data width or any bandwidth as chosen by those skilled in the art for a given implementation. The memory module 315 can include at least read-only memory (ROM) portion 315(1), random-access memory (RAM) portion 315(2), and flash portion 315(3). Portions of the memory module 315 can store software components 320 during execution, as represented by the line 325. The software components 320 can include at least operating system components 320(1), utility or middleware components 320(2), and application components 320(3).

The CPU 305 can communicate with a network interface controller (NIC) 330 via a bus 310(2). The NIC 330 enables the CPU 305 to communicate with external devices via a network 335, which may be a LAN, WAN, or any other type of communications network.

The CPU 305 can communicate with peripheral devices via one or more device interfaces 340. The device interface 340 includes any device appropriate to interface the peripheral devices to communicate with the CPU 305 via the bus 310(3). Some peripheral devices may be associated with appropriate device driver software, which is represented generally by the block 340(1).

FIG. 3 illustrates peripheral devices in the form of secondary storage devices 345, input devices 350, and output devices 355. The secondary storage devices 345 can include a drive 345(1), for removable media, which can include magnetic media, optical media, or any other type of removable or portable media. The secondary storage devices 345 can include a drive 345(2) for fixed media, which can include hard disk drives or the like. The secondary storage devices 345 can also include mass data storage unit 345(3).

The input devices 350 enable users to issue commands to the CPU 305, and can include mouse 350(1), keyboard 350(2), joy stick 350(3), console 350(4), or voice recognition unit 350(5). The output devices 355 enable the CPU 305 provide some level or type of response to the user, and can include monitor 355(1), a television set 355(2) interfaced to communicate with the CPU 305, one or more audio speakers 355(3), and one or more printers 355(4), which can be of any configuration.

Although techniques for managing emergency call services on a per-telephone-number basis in a PBX have been described in language specific to certain features and methods, it is to be understood that the features defined in the appended claims are not necessarily limited to the specific features and methods described. Rather, the specific features and methods are disclosed as illustrative forms of implementing the claimed subject matter.

What is claimed is:

1. A computer readable storage medium containing computer executable instructions that, when executed, direct a computing device to perform a method for managing emergency services, the method comprising:

creating an emergency services shell record associated with a station communications address that is deployed behind a call distributor, wherein the record indicates that the station communications address is managed under a source indication service for emergency calls originating from the station communications address; and creating at least a further emergency services shell record that is associated with at least a further station communications address that is deployed behind the call distributor, wherein the further record indicates that the further station communications address is not managed under the source indication service for emergency calls originating from the further station communications address.

2. The computer readable storage medium of claim 1, wherein the computer executable instructions include instructions for creating an emergency services shell record associated with a station communications address that is deployed behind a private branch exchange.

3. The computer readable storage medium of claim 1, wherein the computer executable instructions include instructions for creating an emergency services shell record associated with a station telephone number.

4. The computer readable storage medium of claim 1, further comprising computer executable instructions for creating a shell record containing address information for at least one of the station communications addresses.

5. The computer readable storage medium of claim 4, wherein the address information contained in the shell record enables processing of at least one emergency call that originates from the further station before a specific communications address has been associated with the station.

6. The computer readable storage medium of claim 4, further comprising computer executable instructions for storing the shell record in a data store.

7. The computer readable storage medium of claim 4, further comprising computer executable instructions for updating the shell record with information provided as part of an initial service order relating to the communications address.

8. The computer readable storage medium of claim 7, further comprising computer executable instructions for presenting the information from the shell record service order in response to an emergency call that originates from the further communications address.

9. The computer readable storage medium of claim 4, further comprising computer executable instructions for presenting the address information from the shell record in response to an emergency call originating from the communications address.

10. The computer readable storage medium of claim 1, wherein the computer executable instructions for creating a shell telephone record are performed in connection with provisioning a new station communications address.

11. The computer readable storage medium of claim 1, wherein the computer executable instructions for creating a telephone record are performed in connection with updating information for an existing communications address.

12. The computer readable storage medium of claim 1, further comprising computer executable instructions for enabling specification on a per-telephone-number basis whether the communications addresses are or are not managed under the source indication services.

13. The computer readable storage medium of claim 1, further comprising computer executable instructions for enabling billing on a per-communications-address basis for the source indication services.

14. A system for emergency management services, the system comprising:
  a call distributor behind which a plurality of communications addresses are deployed;
  a data store in communication with the call distributor and containing:
    a first record for a first one of the communications addresses, wherein the first record indicates that the first communications address is managed under a source indication service for emergency calls originating from the first communications address, and
    at least a second record for at least a second one of the communications addresses, wherein the second record indicates that the second communications address is not managed under the source indication service for emergency calls originating from the second communications address; and
  an emergency services database containing respective shell records for at least the first and second communications addresses, wherein the shell records contain minimum address information for the first and second communications addresses.

15. The system of claim 14, wherein the call distributor is a private branch exchange (PBX), and wherein the communications addresses are telephone numbers.

16. The system of claim 14, wherein the emergency services database is for presenting the address information from the shell records in response to an emergency call originating from the at least one of the communications addresses.

17. An emergency services database comprising:
  a first record corresponding to a first communications address that is deployed behind a call distributor and that is managed under a source indication service, wherein the first record indicates that the first communications address is managed under the source indication service for emergency calls originating from the first communications address; and
  at least a second record corresponding to a second communications address that is deployed behind the call distributor and that is not managed under the source indication service for emergency calls originating from the second communications address.

18. The emergency services database of claim 17, wherein at least the first record is populated by the source indication service.

19. The emergency services database of claim 17, wherein at least the first record is populated from a shell record containing address information.

20. The emergency services database of claim 17, wherein the first record includes an emergency call routing information field.

* * * * *